United States Patent [19]

Sladek

[11] Patent Number: 5,690,052
[45] Date of Patent: Nov. 25, 1997

[54] METHOD FOR SORBING LIQUID USING GROUND WHEAT GRAIN LITTER

[75] Inventor: James H. Sladek, Battle Lake, Minn.

[73] Assignee: Pet Care Systems, Inc., Detroit Lakes, Minn.

[21] Appl. No.: 713,097

[22] Filed: Sep. 16, 1996

Related U.S. Application Data

[63] Continuation of Ser. No. 437,146, May 5, 1995, abandoned.

[51] Int. Cl.$^6$ ................................................. A01K 1/01
[52] U.S. Cl. ................................................. 119/171; 502/401
[58] Field of Search ................................. 119/171, 172, 119/173; 502/401

[56] References Cited

U.S. PATENT DOCUMENTS

| | | |
|---|---|---|
| 327,250 | 9/1885 | Foulds ................................. 426/622 |
| 3,059,615 | 10/1962 | Kuceski et al. . |
| 3,921,581 | 11/1975 | Brewer . |
| 3,983,842 | 10/1976 | Marion et al. . |
| 4,206,718 | 6/1980 | Brewer . |
| 4,217,858 | 8/1980 | Dantoni . |
| 4,258,660 | 3/1981 | Pris et al. . |
| 4,341,180 | 7/1982 | Cortigene et al. . |
| 4,519,340 | 5/1985 | Dickey . |
| 4,571,389 | 2/1986 | Goodwin et al. . |
| 4,685,420 | 8/1987 | Stuart . |
| 4,727,824 | 3/1988 | Ducharme et al. . |
| 4,883,021 | 11/1989 | Ducharme et al. . |
| 4,924,808 | 5/1990 | Pirotte ................................. 119/171 |
| 5,014,650 | 5/1991 | Sowle et al. . |
| 5,109,804 | 5/1992 | Chikazawa . |
| 5,152,250 | 10/1992 | Loeb . |
| 5,176,107 | 1/1993 | Buschur . |
| 5,209,185 | 5/1993 | Chikazawa ................................. 119/171 |
| 5,216,980 | 6/1993 | Kiebke . |
| 5,230,305 | 7/1993 | House . |
| 5,347,950 | 9/1994 | Kasbo et al. ................................. 119/171 |
| 5,361,719 | 11/1994 | Kiebke . |
| 5,448,967 | 9/1995 | Ryan ................................. 119/171 |

FOREIGN PATENT DOCUMENTS

| | | |
|---|---|---|
| 0 076 122 | 4/1983 | European Pat. Off. . |
| 2451159 | 11/1980 | France ................................. 119/171 |
| 2598280 | 11/1987 | France . |
| 60-94043 | 5/1985 | Japan . |
| 3-21251 | 1/1991 | Japan . |
| 405049360 | 3/1993 | Japan ................................. 119/71 |
| 9100418 | 10/1992 | Netherlands . |

OTHER PUBLICATIONS

Declaration of James H. Sladek regarding "Swheat Scoop®" and Heartland Wheat Litter™ commercial products with attached Exhibits A–L.

*Primary Examiner*—Todd E. Manahan
*Attorney, Agent, or Firm*—Merchant, Gould, Smith, Edell, Welter & Schmidt, P.A.

[57] ABSTRACT

The present invention provides an improved method for sorbing aqueous fluids through the use of a biodegradable, clumping, low odor, low attrition, low swelling ground grain litter. The ground grain litter is composed of a ground grain selected such that when the ground grain is wetted it tends to swell in volume less than 50–100%. In a preferred embodiment, the ground grain litter comprises ground hard red spring wheat used to sorb pet urine and fecal liquids voided by a pet into the litter.

9 Claims, No Drawings

METHOD FOR SORBING LIQUID USING GROUND WHEAT GRAIN LITTER

CROSS-REFERENCE TO RELATED APPLICATIONS

The present application is a File Wrapper Continuation application of U.S. Ser. No. 08/437,146, filed May 5, 1995 now abandoned.

FIELD OF THE INVENTION

The method of the present invention pertains to the use of a ground grain litter as a sorbent for aqueous liquids.

BACKGROUND

The use of litter as a sorbent for pet animal urine and other waste liquids has been known for years. Typically, the litter is placed into a container or in an area which the pet has been trained to use for urinating and defecating. Many prior art litters have been derived from sand, clay, and other minimally sorbent materials. More recently the useful life and sorbency of these litters has been increased by addition of binders and other additives which cause a clump to form from litter soiled by urine and fecal liquids. See e.g., U.S. Pat. Nos. 5,216,980 and 5,176,107. Formation of soiled litter into a clump, in part, minimizes the spread of urine or fecal liquids thus minimizing contamination of the unsoiled litter surrounding the excreted waste liquids.

More recently, natural products such as grains, or cellulosic products such as sawdust, woodchips or plant hulls have been used as a litter. See e.g., U.S. Pat. Nos. 4,206,718; 4,727,824; 4,883,021; 5,109,804; 5,152,250. These products were developed in an effort to enhance the sorbency of the litter as well as provide a biodegradable litter which could be flushed down a commode attached to a septic or sewer system. However, although biodegradable, some natural product litters tend to swell excessively when contacted with aqueous liquids and thus cause problems such as blocking the sewer or septic lines when flushed down a commode.

In addition, after wetting, some prior art litters do not form a clump from the wetted (soiled) litter. The failure of soiled litter to form a clump makes it difficult to separate the soiled litter from the unsoiled litter, thus tending to cause greater contamination of the unsoiled litter. Therefore, analogous to the use of binders in minimally sorbent litters, some natural product litters have also relied on binders to cause formation of a clump. See e.g., U.S. Pat. No. 5,152,250. However, the clumps formed by some of these litters often have a high tendency to crumble after drying. A litter which forms a clump which crumbles easily tends to leave soiled litter particles in the unsoiled litter during removal of the clump from the litter container or by the weight of a pet stepping on the clump prior to removal. This obviously increases the chances for contamination of the unsoiled litter.

Moreover, the clumps formed by some prior art litters often have poor attrition resistance. Poor attrition resistance may cause contamination of the unsoiled litter by soiled particles which are abraded from the solid clumps during removal of the clump from the litter container. Also, certain litters, after being wetted and dried, may not reform into a clump if broken and rewetted. The repeated contamination of unsoiled litter by particles of soiled litter results in a decreased useful life of the litter.

Furthermore, the process used to prepare some natural product litters cause the litter to take on a noticeable odor which may be unpleasant for the pet owner. An odor emanating from the litter may also prevent an animal from voiding in the litter container resulting in urination or defecation at places other than the litter container. This obviously can create problems for a pet owner sharing the same living space as the pet.

Thus, there exists a need for an improved natural litter product which is biodegradable, low swelling, low odor and which when soiled tends to form a scoopable clump which is relatively attrition resistant and does not crumble easily after drying.

SUMMARY OF THE INVENTION

The present invention provides an improved method for sorbing aqueous liquids using a ground grain litter. The invention provides a ground grain litter which is biodegradable, scoopable, flushable, low odor, low swelling and has a low tendency for attrition.

According to the invention, a ground grain litter is composed of a ground grain that is of a type which, when water is intermittently added to the ground grain until an excess of water lays over the ground grain and is allowed to sit for 20 minutes, does not increase in volume by more than 100%. In a preferred embodiment, the ground grain utilizing the ground grain litter is derived from wheat varieties including white wheat, spring wheat, winter wheat, durum and combinations thereof.

A ground grain litter of the invention is prepared by grinding whole raw grain in a roller mill or hammer mill at a moisture content of, preferably, 10–17%. A majority of the ground grain particles resulting from the grinding process are in a range of 250–2,500 microns in size.

In a preferred embodiment, the ground grain litter of the invention may be used to sorb aqueous animal waste of a pet which lives in a home, apartment, office space or other building structure where humans and pets share the same space.

The invention further provides an arrangement for sorption of aqueous animal waste which is composed of a litter container having the ground grain litter contained therein.

DETAILED DESCRIPTION

The present invention is an improved method for sorbing aqueous liquids using a ground grain litter. The improvement, according to the invention, is in the use of a litter composed of a biodegradable ground grain which is prepared by a process which causes the ground grain to have a low odor which makes it more appealing to the pet and pet owner. In addition, when soiled by an aqueous liquid, the ground grain of the invention tends to form a low attrition clump which is easily separated from the surrounding unwetted litter. Moreover, when contacted with aqueous liquids the ground grain of the litter has a lower tendency to swell thus making it less likely to plug sewer or septic systems when flushed down a commode.

The ground grain utilized in a litter of the present invention is not used as a binder which is added to another litter material to cause clumping. The ground grain is itself a sorbent. It is suitable for mixing with other natural or minimally sorbent litter products. Moreover, unlike U.S. Pat. No. 5,361,719 which discloses a litter composition which is composed of a ground grain liquid permeable base and a high gluten hydrating media, the present litter utilizes a single or multiple ground grain which does not require a high gluten hydrating media.

The ground grain litter of the invention is suitable for sorbing any aqueous liquid. In a preferred embodiment, the ground grain litter is useful for sorbing aqueous animal waste. As used herein, the phrase "aqueous animal waste" means animal urine and aqueous liquids associated with fecal material which are voided by an animal. Typically, litters of the present field of the invention are used for sorption of pet animal wastes, for example, a cat. In a preferred embodiment, the litter is placed into a litter container in which the pet has been trained to enter to urinate or defecate. The litter container, which contains the ground grain litter, is situated such that it may be contacted by an aqueous liquid. In practical terms, this means that the litter container is placed in a location accessible for the pet to void whenever necessary when housed in a home, apartment, office space or other building structure where humans and pets share the same space.

The litter container may be made of any material which is impervious to aqueous animal waste. The size and shape of the container is variable, but usually it is at least large enough for the pet to enter into and move around, but is not so large as to prevent lifting of the container by a person for disposal of the soiled litter. Usually the container has a bottom and sides which are high enough to maintain a depth of litter sufficient to surround the litter and sorb the voided aqueous animal waste. Typically, a container has a volume capacity of 1 to 5 liters.

As used herein, a "ground grain litter" is a litter composition containing ground grain. The ground grain is provided in the litter at greater than 30% by weight ground grain, preferably greater than 80% by weight ground grain. If the ground grain litter is made up of less than 100% of ground grain, the nonground grain portion of the litter may be composed of any other known or later discovered litter material. The nonground grain litter component may also contain compounds which function to mask or neutralize waste odors, provide an attractant for the animal, inhibit bacterial growth, or other similar nonsorbent function.

As used herein, the phrase "ground grain" means whole raw grain which is prepared using a process which is described in detail below. As used herein, the phrase "whole raw grain" refers to a whole grain kernel as it comes out of a harvesting device typically used in harvesting agricultural products, for example, combines and threshers. Often the whole grain kernel coming out of a harvesting device will have associated with it chaff and stalk remnants. These remnant materials may or may not become part of the ground grain litter.

Whole raw grains which may be selected for use as a ground grain of the invention include, for example, cereal grains such as wheat, sorghum, barley, rice, oats, rye, triticale, millet, corn and other grains for which "cereal grain" is a generic term. The ground grain may be prepared from a single whole raw grain or combinations of one or more whole raw grains which may be combined before or after the grinding process. Preferred cereal grains of the invention may be selected from the group of wheat varieties including white wheat, spring wheat, winter wheat and durum. A particularly preferred wheat variety is hard red spring wheat.

The ground grain litter is prepared by grinding whole raw grain, and optionally combining the ground grain with another litter material and/or other nonsorbent compounds. According to the invention, the ground grain is prepared from whole raw grain which has a moisture content of up to 20%, preferably about 10–17%, most preferably about 13%.

Prior to grinding, the whole raw grain is put through a cleaning device to remove foreign materials including stones, rocks, metal, dirt, dust, weed seed and other nongrain material. Such cleaning devices are known in the grain grinding art and include, for example, magnets, disk cleaning mills, sieve cleaning mills and similar devices. The grain may then optionally be subjected to deinfestation using an infestation destroyer. The order in which the grain is cleaned and deinfested is not important. Infestation destroyers are known in the art.

After the grain is cleaned and deinfested it is subjected to a single or dual head roller or a hammer mill to crush the whole grain into a smaller particle size. When using a roller mill, the rollers are set apart at about 0.002 to 0.025 inch, preferably about 0.008 to 0.0018 inch. This amount of spacing between rollers tends to produce a majority of particles which are in a size range between 250–2,500 microns. If a hammer mill is used, an appropriate mesh size is used to produce ground grain having a majority of particles in a size range between 250–2,500 microns. After the grain is crushed (ground) it moves into a sifter where large particles are separated by passing through a mesh sieve and returned to the roller or hammer mill until the proper particle size is achieved.

The sieve mesh size used in the sifter is 8–100 mesh, preferably 10–12 mesh. The mesh sizes are in terms of U.S. Standard Sieve Series, Fine Series of 1940 (10 mesh=2000 microns sieve opening, 50 mesh=297 microns, 100 mesh=149 microns). Typically, the oversized ground grain is returned to the mill about 2–4 times to achieve a homogeneous particle size. In a preferred embodiment, at least 75% of the particles are from about 250–2500 microns. Once the desired particle size is achieved the ground grain is ready for use in a ground grain litter of the invention.

Unlike processes used to prepare some natural grain litter products, the process used to prepare the ground grain of the present invention does not add moisture during grinding. However, if the whole raw grain used to prepare the ground grain is at a moisture level below about 10%, water may be added to the whole raw grain prior to grinding to minimize the dust content of the final product.

Similar to U.S. Pat. No. 5,230,305, a ground grain of the present invention typically has a bulk density of about 350 $kg/m^3$ to 900 $kg/m^3$. When a preferred ground grain is prepared according to the invention, it will generally have a bulk density of about 550 $kg/m^3$. Also, a ground grain prepared according to the invention generally has a reducing sugar content of about 0.1% to about 2.5%. A preferred ground grain prepared according to the invention generally has a reducing sugar content of about 0.5%. The cold water solubles content of a ground grain prepared according to the invention is about 10–70%. A preferred ground grain prepared according to the invention has a cold water solubles content of about 30%.

The method used for determining the bulk density of the ground grain of the invention is described in Example 1. The method used to determine the reducing sugar content is known in the art and described in "AOAC Official Methods of Analysis," Association of Analytical Chemists, Method 925.42 (15th ed.) The method used to determine the percentage of cold water solubles is known in the art and described in "Standard Analytical Methods of the Member Companies of the Corn Refiners Association, Inc.," Standard B-56, Corn Refiners Association, Inc., 1100 Connecticut Avenue, N.W., Washington, D.C. 20036 (6th ed.)

Upon contact with aqueous liquids, the ground grain of the present invention tends to form a low attrition clump. As used herein, the phrase "low attrition clump" means a clump which, after drying, loses less than about 15% of its weight, preferably less than about 10% of its weight, when subjected to attrition testing. The test used to determine the percent attrition of a clump formed by the ground grain of the invention is described in Example 6.

Low attrition clumps are advantageous because they are less likely to lose particles of soiled litter when the clump is removed from the surrounding unsoiled litter in a litter container. This property of a litter is also advantageous in preventing particles of dry soiled litter from breaking off of a soiled clump if subjected to compression by an animal stepping on the clumps while moving around in the litter. In addition, the clumps formed by the ground grain of the invention are capable of reforming on contact with an aqueous liquid if broken after forming. A low attrition clump provides a significant advantage over prior art litters by increasing the useful life of the litter through decreased contamination of unsoiled litter by particles falling away from the soiled clump into the unsoiled litter.

It has been observed by the inventor that when a preferred ground grain is prepared according to the process used in the invention, the ground grain emits a low odor. It may be theorized that a high odor litter composition is due to certain specific agents or compounds present in the material. It may be further theorized that reducing and/or removing compounds used in preparing a litter which are responsible for the odor will result in an improved litter. For example, a wheat grain litter prepared according to a method disclosed in U.S. Pat. No. 5,230,305 has a characteristic "burnt wheat" smell. Removal or prevention of forming of agents responsible for such smells provides an improvement over such prior art litters.

The identification, isolation and quantification of an odor from a grain litter product can be a very complex process. That process becomes even more complex when it is desirable to standardize and correlate subjective sensory evaluation data with quantitative analytical data. However, certain methods are known and usable to reliably accomplish this task. Such methods are known and have been described, for example, in U.S. Pat. No. 5,137,744, column 5, line 51 through column 7, line 48 which is incorporated herein by reference. Although testing was not performed, it is believed that by using such methods, the ground grain litter of the present invention will be found to have a lower odor relative to some prior art litters. It is further believed that this feature enhances the desirability for household use of a ground grain litter product.

Also, when contacted with aqueous liquids, the ground grain litter of the invention tends to swell less than some other ground grain based litters. As used herein, "swell" means the tendency of the litter to increase in volume when contacted with an aqueous liquid. This attribute is particularly beneficial if the soiled litter is flushed down a commode attached to a sewer or septic system. By using a litter which swells less upon contact with aqueous liquids, sewer or septic systems have less tendency to become blocked or plugged when the litter is flushed down a commode. The method used to determine the swelling of a preferred ground grain of the invention is described in Example 5. A ground grain litter of the invention tends to swell less than about 100% when contacted with aqueous liquids, preferably, less than 70%. As used herein, a ground grain which swells 100% means that the ground grain doubles in volume upon contact with water using the method described in Example 5.

While the inventors do not wish to be held to any single theory, it is believed that many of the properties of the present ground grain litter are, in part, a result of the milling process used to prepare the ground grain. Unlike some milling processes which may impregnate the grain with gas and moisture prior to grinding, the preferred process used to prepare the ground grain of the present litter is, relatively speaking, a drier process which causes an increased amount of damaged starch post grinding. It is believed that the high quantities of damaged starch provide, in part, the advantageous properties.

The following examples will further describe the method for preparing a ground grain litter of the invention and the tests performed to determine the various characteristics of the litter.

EXAMPLES

Example 1

Preparation of a ground grain litter and determination of ground grain particle size in microns.

500 lbs. of raw whole red spring wheat was cleaned. The wheat was put through a single head roller mill with the rollers having a gap of 0.010 inch. The resulting grain was passed through a sifter containing a 10 mesh sieve 3 times. The resulting ground grain was then analyzed to determine particle size, bulk density, percentage cold water solubility and reducing sugar content. Table 1 shows the particle size distribution of a 200 gram sample of the ground grain litter. As seen in Table 1, approximately 95% of the particles are within a size range of about 250 to 2,500 microns.

TABLE 1

PARTICLE SIZE DISTRIBUTION

| Screen Size (microns) | Wt. Retained (gms) | % Wt. Retained |
|---|---|---|
| 2380 | 2.53 | 1.26 |
| 1180 | 104.53 | 52.22 |
| 850 | 42.52 | 21.24 |
| 589 | 22.92 | 11.49 |
| 425 | 10.99 | 5.49 |
| 297 | 7.27 | 3.53 |
| 250 | 2.21 | 1.10 |
| Pan | 7.07 | 3.52 |

Example 2

Determination of ground grain litter particle size in terms of sieve mesh size.

Ground grain was prepared from raw whole hard red spring wheat as described in Example 1. The particle size of the ground grain litter was determined using various sieve mesh sizes. The resulting particle distribution is shown in Table 2.

TABLE 2

| Sieve Mesh Size | Percentage of Particles |
|---|---|
| 10–30 | 82.8% |
| 30–40 | 6.5% |
| 40–50 | 3.3% |
| 50–60 | 0.9% |
| 60–100 | 2.3% |
| >–100 | 4.2% |

Example 3

Determination of bulk density of a ground grain litter.

The bulk density for the ground grain litter prepared in Example 1 was determined by dividing the weight in grams of a sample by the volume of the sample in milliliters. After the sample was weighed, it was put into a measuring cylinder and tapped gently until no further settling was observed. The volume was then read. Three different bulk densities were determined from different locations in the sample and are shown in Table 3.

TABLE 3

| BULK DENSITY OF GROUND GRAIN LITTER | | | |
|---|---|---|---|
|  | 1 | 2 | 3 |
| Wt (gms) | 51.23 | 44.9 | 33.67 |
| Vol (ml) | 92.00 | 88.00 | 57.00 |
| Density $\frac{kg}{m^3}$ | 556.8 | 510.2 | 590.7 |

The average bulk density of this sample is about 552.6 kg/m$^3$.

Example 4

Determination of % cold water solubility.

The percentage cold water solubility for the sample prepared in Example 1 was determined using Standard B-56 in "Standard Analytical Methods of the Member Companies of the Corn Refiners Association" (6th ed.). The test was run 4 times on a single sample and an average value calculated.

TABLE 4

| PERCENTAGE COLD WATER SOLUBILITY | | | | |
|---|---|---|---|---|
| Sample No. | 1 | 2 | 3 | 4 |
| Percentage Cold Water Solubility | 30.77 | 30.20 | 27.98 | 27.15 |

The average cold water solubility for the 4 samples was 29.02±1.73.

Example 5

Determination of percentage swelling of ground grain litter when contacted with water.

For purposes of describing the percent swelling of the ground grain of the invention, the following method was used. A pre-weighted glass or plastic container was filled to a predetermined volume (41 ml), with a ground grain sample. The sample and container were weighed and water was added intermittently as it was sorbed until an excess of water laid over the grain sample. The sample was allowed to sit for 20 minutes. Final volume of the ground grain in the container was measured in milliliters and the wetted grain was then removed from the container without disturbing any remaining nonwetted grain. The container was then inverted and the dry grain removed, screened through a 10 mesh sieve, and weighed. The dry volume of wetted litter was calculated. From this the percent volume increase due to wetting was calculated. Results are shown in Table 5.

TABLE 5

| Sample | Sample (g) | Water Absorbed (g) | Nonwetted Sample (g) | Wetted Sample (g) | Wetted Sample (ml) | Volume Increased (ml) | Percent Volume Increase |
|---|---|---|---|---|---|---|---|
| Hard red spring wheat | 28.9 | 21.0 | 5.5 | 23.4 | 31.1 | 10 | 32 |
| Hard red spring wheat treated according to U.S. Pat. No. 5,230,305 (average of 2 samples) | 27.6 | 35.9 | 11.53 | 16.0 | 23.9 | 31 | 130 |

Example 6

Determination of the attrition of clumps of hydrated litter.

For purposes of describing the attrition resistance of the clumps of ground grain formed on wetting the grain, the following method was used. Clumps of hydrated ground grain were formed by wetting the litter with 6 grams of water and allowing the sorbed water to set for five minutes. Thereafter the clumps formed were carefully removed from the nonwetted litter and dried. The dried clumps were weighed. The attrition was then determined by carefully removing the bonded but poorly adhering particles on the surface of the clumps by gently rubbing a finger across the surface and weighing the particles removed. The results are shown in Table 6.

TABLE 6

| Litter Sample | Wt. of Dried Lump (g) | Wt. of Lump After Attrition (g) | Loss on Attrition (g) | % Attrition |
|---|---|---|---|---|
| Hard Red Spring Wheat | 10.05 | 9.2 | 0.85 | 8.5 |
| Hard Red Spring Wheat treated according to | 7.8 | 6.2 | 1.6 | 20.3 |

TABLE 6-continued

| Litter Sample | Wt. of Dried Lump (g) | Wt. of Lump After Attrition (g) | Loss on Attrition (g) | % Attrition |
|---|---|---|---|---|
| U.S. Pat. No. 5,230,305 (average of 2 samples) | | | | |

All patents and publications in the specification are indicative of the level of ordinary skill in the art to which this invention pertains. All patents and publications are herein incorporated by reference to the same extent as if each individual patent and publication was specifically and individually indicated by reference.

It will be apparent to one of ordinary skill in the art that many changes and modifications can be made in the invention without departing from the spirit or scope of the appended claims.

What is claimed is:

1. A method for sorbing an aqueous liquid utilizing a ground wheat grain litter, said method comprising the step of:

(a) situating a ground wheat grain litter to be contacted by an aqueous liquid to be sorbed, wherein said ground wheat grain litter consists essentially of a ground whole wheat grain.

2. The method according to claim 1 wherein said ground whole wheat grain is hard red spring wheat.

3. A method for sorbing an aqueous liquid utilizing a ground wheat grain litter, said method comprising the steps of:

(a) selecting a whole wheat grain;

(b) grinding said whole wheat grain;

(c) providing 30% to 100% by weight of the ground wheat grain ground in step (b) in a ground wheat grain litter;

(d) situating the ground grain litter of step (c) to be contacted by an aqueous liquid to be sorbed;

wherein said ground grain litter does not include an added gluten based media and said ground grain litter does not include added grain flour.

4. The method according to claim 3, wherein selecting said whole wheat grain of said step (a) comprises selecting from the group of wheat grains consisting of white wheat, spring wheat, winter wheat, durum, and combinations thereof.

5. The method according to claim 3, wherein the whole wheat grain selected in said step (a) is hard red spring wheat.

6. The method according to claim 3, wherein the aqueous liquid contacted with the ground wheat grain litter in said step (d) is aqueous animal waste.

7. The method according to claim 3, wherein the whole wheat grain ground in step (b) is ground to a particle size such that at least 75% of the ground grain consists of particles in the size range of 250–2500 microns.

8. The method according to claim 3, wherein the ground wheat grain provided in the ground wheat grain litter of step (c) is greater than 80% by weight.

9. A method for sorbing an aqueous liquid utilizing a ground wheat grain litter, said method comprising the steps of:

(a) selecting a whole hard red spring wheat grain;

(b) grinding said whole hard red spring wheat grain, in a mill, at 10–17% moisture, such that after grinding at least 75% of the ground grain consists of particles in a range of 250–2500 microns in size;

(c) providing 50–100% by weight of the ground wheat grain of step (b) in a ground grain litter; and (d) situating the ground grain litter of step (c) to be contacted by a aqueous liquid to be sorbed;

wherein said ground wheat grain litter does not include an added gluten based media and said ground grain litter does not include added grain flour.

* * * * *